United States Patent [19]

Logan

[11] 4,378,263

[45] Mar. 29, 1983

[54] METHOD AND APPARATUS FOR MAKING A COMPOSITE MATERIAL TRUSS

[76] Inventor: Robert M. Logan, 5840 Harvestwood Cir. #212, Fort Worth, Tex. 76112

[21] Appl. No.: 228,359

[22] Filed: Jan. 26, 1981

[51] Int. Cl.³ .............................................. B32B 1/00

[52] U.S. Cl. .................................... 156/161; 118/428; 156/163; 156/166; 156/210; 156/433; 156/469; 156/494; 156/578; 264/258; 264/263; 428/186; 428/178

[58] Field of Search ................. 156/197, 210, 214, 91, 156/160, 161, 494, 163, 164, 469, 467, 470, 471, 578, 292, 245, 500, 166, 433, 441; 118/427, 428, 429; 264/137, 257, 258, 263, 275, 277, 278, 279, 279.1; 249/60, 83, 91, 93, 96, 95; 425/110, 111, 112, 117; 52/690; 428/186, 131, 113, 110, 178; 427/430.1

[56] References Cited

U.S. PATENT DOCUMENTS

| | | | |
|---|---|---|---|
| 2,558,855 | 7/1951 | Knewstubb et al. | 156/169 |
| 2,606,133 | 8/1952 | Havens | 156/469 |
| 3,009,578 | 11/1961 | Foote et al. | 264/278 |
| 3,033,734 | 5/1962 | Price | 156/197 |
| 3,232,806 | 2/1966 | Widmer | 156/212 |
| 3,356,555 | 12/1967 | Jackson | 156/469 |
| 3,442,738 | 5/1969 | Scott et al. | 156/161 |
| 3,487,481 | 1/1970 | Richardson et al. | 5/354 |
| 3,551,237 | 12/1970 | Cox et al. | 156/175 |
| 3,641,230 | 2/1972 | Jenks | 264/137 |
| 3,813,837 | 6/1974 | McClain et al. | 52/309 |
| 3,893,878 | 7/1975 | Kaempen | 156/161 |
| 3,960,236 | 6/1976 | Holmes | 428/131 |
| 4,223,053 | 9/1980 | Brogan | 52/690 |

FOREIGN PATENT DOCUMENTS

| | | | |
|---|---|---|---|
| 2004835 | 4/1979 | United Kingdom | 156/169 |

*Primary Examiner*—Michael W. Ball
*Attorney, Agent, or Firm*—James E. Bradley

[57] ABSTRACT

A method for making a fiberglass truss has features that eliminate the need for a mold. The method includes first a step of tensioning a pair of spaced-apart filaments strips to define the chords for the truss. The chords are interconnected at several points along their lengths with a strip of filaments for defining triangular bracing or a web for the truss. Tension is applied to the strips to secure the chords and web in place. Then the chords and web are coated with resin. After hardening, the tension is removed. In one method, the chords are tensioned between two end walls of a container. The intersecting points of the web and chords are restrained against lateral movement by means of retaining devices mounted to two oppositely facing side walls. Triangular spacer elements define passageways for the chords and web. The container is filled with resin after the chords and web have been placed and tensioned. After impregnation, the container is drained. The completed truss may be removed after hardening.

6 Claims, 4 Drawing Figures

METHOD AND APPARATUS FOR MAKING A COMPOSITE MATERIAL TRUSS

BACKGROUND OF THE INVENTION

This invention relates in general to methods of constructing composite structures, such a fiberglass, and in particular to a method for constructing a fiberglass truss.

Fiberglass structures are normally formed by first constructing a mold in the desired configuration. Then, layers of fiberglass cloth and strands are laid into the mold and coated with resin.

In the case of a truss, this requires a considerable amount of hand labor. A truss normally has two chord members that are spaced apart from each other. A triangular web serves as bracing between the chord members. The numerous joints and interconnections within the mold require considerable hand treatment. Also, if the configuration of the truss is to be varied, a new mold must be provided. Consequently, it would be desirable to be able to construct a fiberglass truss without a mold.

SUMMARY OF THE INVENTION

This invention describes a method for constructing a composite material truss without using a mold. First, two filament strips are spaced apart and tensioned to define chords for the truss. Then these chords are interconnected at several points along their lengths with a strip of filaments to define a web for the truss. Then, tension is applied to the ends of web while restraining the chords and the web at the interconnecting points. This creates a fairly rigid structure in the shape of a truss. Then, the chords and webs are coated with resin to harden the truss, and the tension is removed after hardening.

In the preferred embodiment, the truss is formed inside a container. The ends of the chords are tensioned between two end walls. The interconnecting points are restrained by retainers carried by two side walls.

DESCRIPTION OF THE PREFERRED EMBODIMENT

Figure 1:
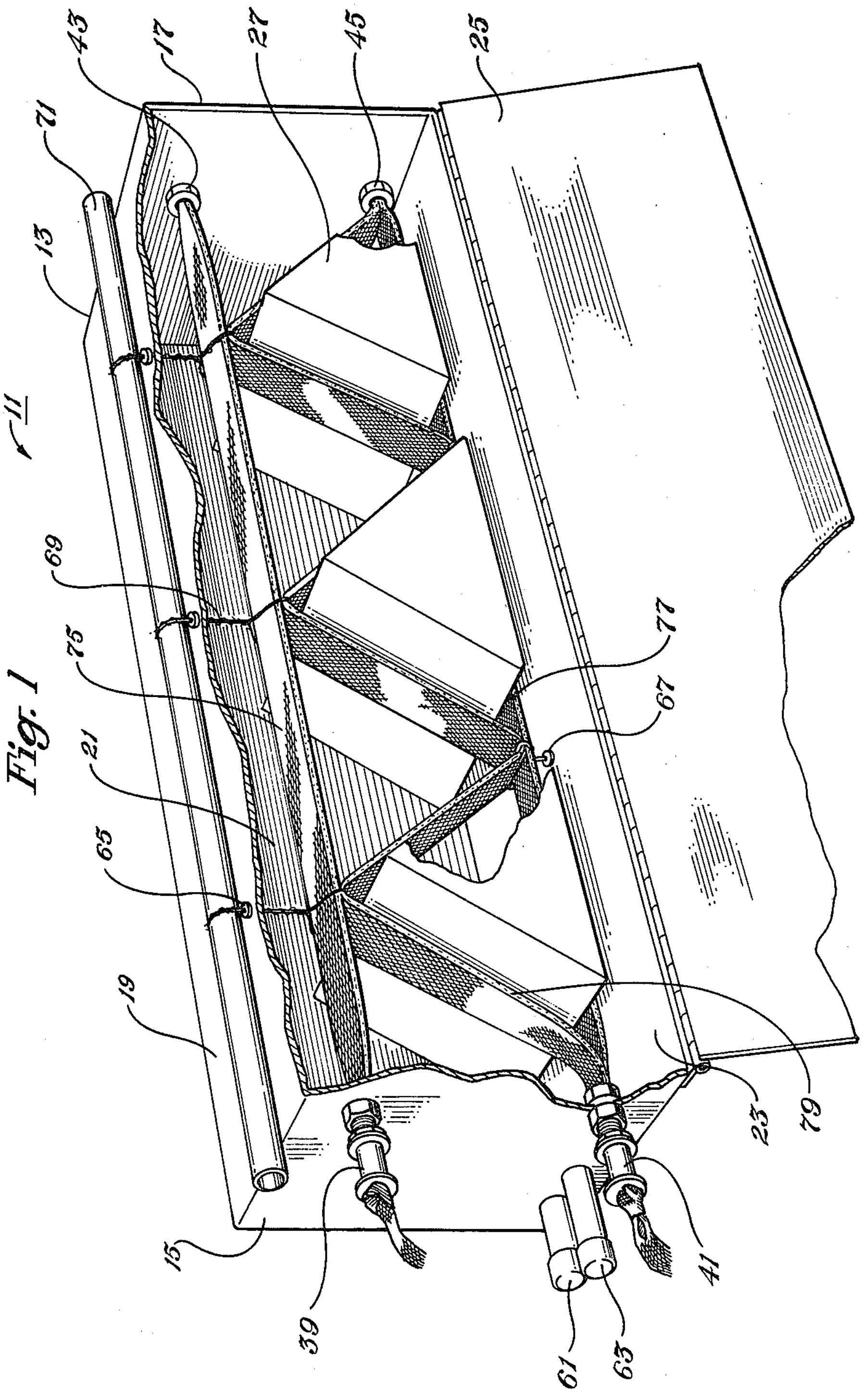
FIG. 1 is a perspective view of part of a apparatus used for constructing a truss in accordance with this invention, with some of the spacer elements removed for clarity.

Referring to FIG. 1, an apparatus 11 is partially shown. Apparatus 11 includes a rectangular container 13 with two parallel end walls 15 and 17. End walls 15 and 17 are connected together by three side walls 19, 21 and 23. Side walls 19 and 23 are parallel with each other, and spaced apart on the top and bottom of the container 13. Side wall 21 is perpendicular to top and bottom walls 19 and 23, and forms the back of the container. A hinged door 25 serves as the front side wall of container 13, and is parallel with back wall 21 when door 25 is closed.

Figure 2:
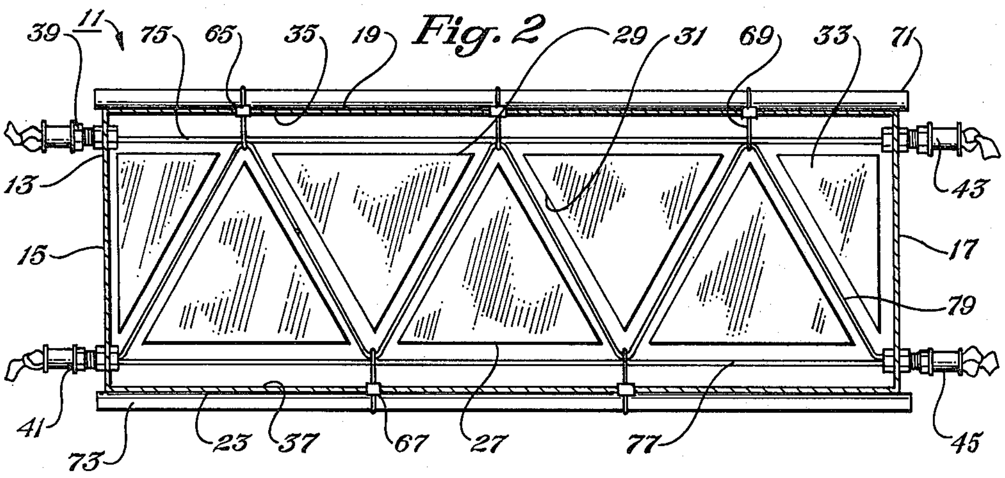
FIG. 2 is a view of the apparatus of FIG. 1, partially in section, with all of spacer elements shown.

A plurality of triangular spacers 27 are rigidly mounted to the back wall 21. Each spacer 27 has a side in the configuration of an equilateral triangle with its apex pointing upward. Spacers 27 are slightly less in height than the height of the back wall 21, and have lengths slightly less than the width of bottom wall 23. Spacers 27 are equally spaced-apart along side wall 21, with spaces between them. There are also a group of spacers 29, as shown in FIG. 2 that are mounted rigidly to side wall 21 and are of identical configuration with spacers 27, but with their apexes facing downward. These spacers 29 have not been shown in FIG. 1 so that the method can be more clearly illustrated. Referring to FIG. 2, each spacer 29 fits between two spacers 27, defining diagonal passageways 31 between their surfaces.

Two downwardly facing spacers 33, each half the width of a spacer 27 or 29, are located on the ends and rigidly fastened to side wall 21, as shown in FIG. 2. The spacers 27, 29 and 33, when viewed from the side as shown in FIG. 2, result in longitudinal passageways 35 and 37 extending along the lengths of the top and bottom walls 19 and 23. Passages 35 and 37 are bounded by the bases of the spacers 27, 29, and 33, and are interconnected with the diagonal passages 31.

Referring again to FIG. 1, end wall 15 has a pair of tensioning devices 39 and 41 mounted over spaced-apart apertures. Similarly, end wall 17 has a pair of tensioning devices 43 and 45 located in spaced-apart apertures. Tensioning devices 39 and 41 are located in the same vertical plane as the tensioning devices 43 and 45, this plane being parallel with the plane containing back wall 21. Also, the upper tensioning devices 39 and 43 are located in a common horizontal plane that is parallel with a common horizontal plane containing lower tensioning devices 41 and 45. The upper tensioning devices 39 and 43 are aligned with the passageway 35 while the lower tensioning devices 41 and 45 are aligned with the passageway 37.

Figure 3:
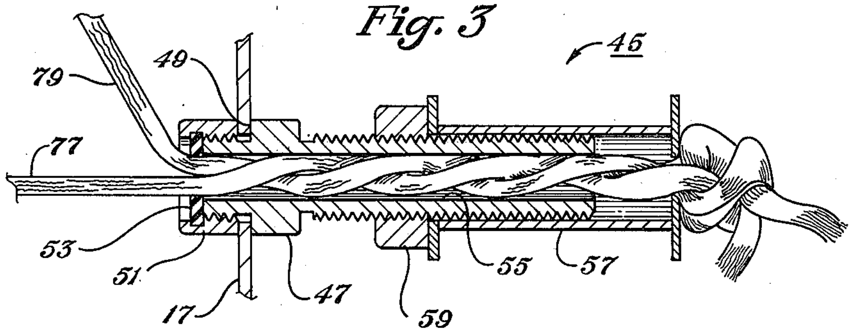
FIG. 3 is an enlarged, vertical sectional view of one of the tensioning devices for the apparatus of FIG. 1.

Referring to FIG. 3, each tensioning device has a stem 47 that inserts through an aperture in an end wall, such as aperture 49 of end wall 17. Stem 47 is secured on the inner side by a threaded cap 51, which contains a resilient sealing member 53. Stem 47 has a passageway 55 extending completely through it. A hollow sleeve 57 is adapted to be received over the outer end of stem 47. Sleeve 57 has flanges on both ends. The inner end of sleeve 57 contacts a nut 59 that engages threads on the exterior of the stem 47. Rotating nut 59 in one direction will push the sleeve 57 further outward, while rotating nut 59 in the other direction, will allow the sleeve 57 to be pushed futher inward. In this manner, tension can be applied to filament ends, as will be explained hereinafter.

Referring again to FIG. 1, one of the end walls, such as end wall 15 has a drain plug 61 and a filler plug 63. Top wall 19 has a plurality of apertures 65, each containing a resilient seal element, and each being located in a separate vertical plane that also contains the apex of one of the spacers 27. The bottom wall 23 has a plurality of apertures 67, each having a resilient seal element. Apertures 67 are located in separate vertical planes, each vertical plane passing through an apex of a spacer 29. This placement causes apertures 65 and 67 to be equally staggered. Each aperture 65 and 67 is adapted to receive a retaining means 69 that will be described subsequently. A bar 71 extends along the top of top wall 19 for engaging retaining means 69. A bar 73 extends along the bottom of bottom wall 23, as shown in FIG. 2, for engaging retaining means 69 on the lower side.

In operation, to construct a truss, first door 25 is opened. Then, a first strip 75 of fiberglass filament is drawn along passageway 35 (FIG. 2). The ends of the filament strip 75 are inserted through the tensioning devices 39 and 43. Strip 75 may be a weave, or it might be a single strand or a multiple strand of unidirectional filaments. Then, a strip 77 of fiberglass filaments is drawn along passageway 37, with its ends inserted through tensioning devices 41 and 45. Then, a third strip 79 is drawn along the diagonal passages 31 between the spacers 27 and 29, with its ends inserted through tensioning devices 41 and 45. The third strip 79 is brought into contact with the first and second strips 75 and 77 at points adjacent the apertures 65 and 67.

When in contact, each retainer 69 is secured to the point of intersection and inserted through an aperture 65 or 67. Retainer 69 will include one or more unidirectional filaments wrapped around the point of engagement and inserted through one of the apertures 65 and 67. The outer end of each retainer 69 comprises a loop through which a rod 71 or 73 passes. A stiffening device will be also placed at the junctions to keep the strips 75, 77 and 79 in their flat configuration, as shown in FIG. 1.

Then the ends of the filament strips 75, 77 and 79 are drawn tightly outward through the tensioning devices. As shown in FIG. 3, a knot is placed on the ends of the filament strips to bear against the outer flange of the sleeve 57. Then sleeve 57 is moved outward with nut 59 to draw the filament strips into tension. The retainers 69 restrain the junctions of the strips and prevent any lateral or inward movement of these junctions with respect to the lengths of strips 75 and 77. Similar retainers, in addition to the retainers 69 shown may be necessary to provide the necessary restraint. The strips 75, 77, and 79 will not contact spacers 27, 29 and 33 while under tension. A non stick film or coating is placed in the interior of container 13 on portions other than strips 75, 77, and 79 to prevent resin from adhering to portions other than strips 75, 77 and 79.

Figure 4:
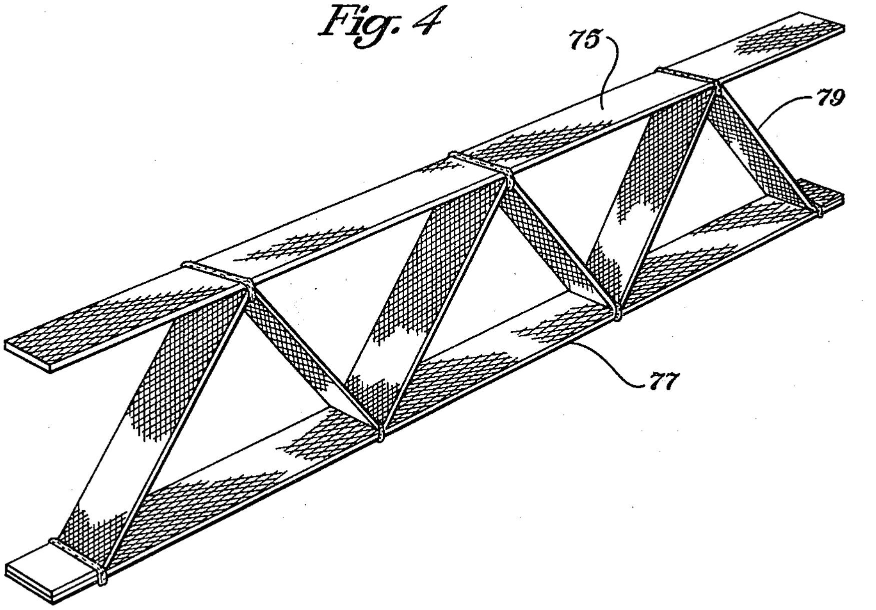
FIG. 4 is a perspective view of a completed truss constructed in accordance with this method.

Then, door 25 is closed and resin is introduced into filler plug 63 to coat the filaments 75, 77 and 79. After sufficient soaking time, the resin is drained from drain 61. Then, after hardening, the tension is removed on the ends of the strips 75, 77 and 79 by snipping off the knots after nuts 59 have been rotated inward. The retainers 69 are snipped off flush with the tops and bottoms of strips 75 and 77, then the completed fiberglass article is removed from the container. As shown in FIG. 4, strips 75 and 77 become the chords of the truss, which in this embodiment are parallel and located in the same vertical plane. Strip 79 becomes the web of the truss, providing triangular bracing between the two chords.

This invention has significant advantages. No molds are required, rather only means for tensioning the ends and restraining the intersecting points of the web and chords. The truss can be made very thin and light, utilizing even a single strand if desired. Pretensioning can be placed on the truss, and the shapes of the truss can be varied with a single forming apparatus. The spacer elements reduce the amount of resin needed to place in the container.

While the invention has been shown in only one of its forms, it should be apparent to those skilled in the art that it is not so limited but is susceptable to various changes and modifications without departing from the spirit of the invention.

I claim:

1. A method for making a truss of composite material comprising:
 providing a container with two opposite end walls;
 drawing a pair of filament strips between the end walls to define spaced-apart chords of a truss; then
 interconnecting a third filament strip with first one of the chords, then the other chord, to define a triangular web between the chords;
 tensioning the chords and web while restraining the chords and web at the interconnecting points; then
 filling the container with resin to coat the chords and web while maintaining tension; then
 draining the resin from the container and allowing the coated chords and web to harden; then
 removing the chords and web from the container.

2. A method for making a truss of composite material comprising:
 providing a container with two opposite side walls and two opposite end walls;
 providing a pair of apertures in each end wall;
 providing a plurality of apertures in each side wall, with the apertures in one side wall staggered from the apertures in the other side wall;
 drawing a pair of filament strips between the end walls to define spaced-apart chords of a truss, with one end of each filament strip protruding through one of the apertures in the end walls;
 interconnecting a third filament strip with first one of the chords, then the other chord, to define a triangular web between the chords;
 inserting a retaining means through each aperture in the side walls to restrain inward movement of the web and chords at each point of interconnection;
 inserting the ends of the web through one of the apertures in each end wall;
 tensioning the chords and web; then
 filling the container with resin to coat the filament while maintaining tension; then
 draining the resin from the container and allowing the coated filaments to harden; then
 removing the chords and web from the container.

3. The method according to claim 2 wherein the filaments are fiberglass.

4. An apparatus for forming a composite material truss having two spaced-apart chords interconnected by a triangular web, comprising:
 a housing with two opposite ends;
 aperture means in at least one of the ends for allowing spaced-apart strips to be drawn through at least one of the ends and between the ends to define the chords;
 tensioning means mounted to each end and spaced-apart from each other on each end for receiving and tightening the chords;
 retaining means carried between the two ends for retaining from inward movement interconnecting points of the chords at the corners of the triangular web; and
 means for introducing into the housing and removing from the housing a liquid for coating the web and chords.

5. An apparatus for forming a fiberglass truss, comprising:
 a container with top and bottom walls, two opposite side walls, and two opposite end walls;

a pair of tensioning means mounted to each end wall and spaced apart for receiving and tightening flexible strips extending between the two end walls;

a plurality of triangularly shaped spacers rigidly mounted to one of the side walls, each spacer having an apex pointing to a selected one of the top and bottom walls, the spacers being oriented so that a downwardly pointing spacer is located between two upwardly pointing spacers, defining upper and lower passageways extending along the lengths of the top and bottom walls that are interconnected by diagonal passageways;

retaining means mounted to the top and bottom walls adjacent each apex of each spacer for retaining the flexible strips from inward movement; and means for introducing to the container and draining from the container a liquid for coating strips drawn along the passageways.

6. The apparatus according to claim 5 wherein each retaining means comprises:

an aperture containing a seal element for receiving a filament strand, the strand being adapted to be secured to one of the strips; and means for securing the strands against inward movement.

* * * * *